United States Patent

Gupta et al.

Patent Number: 5,848,121
Date of Patent: Dec. 8, 1998

[54] METHOD AND APPARATUS FOR DIGITAL SUBTRACTION ANGIOGRAPHY

[75] Inventors: Rajiv Gupta, Niskayuna, N.Y.; Chukka Srinivas, Malden, Mass.

[73] Assignee: General Electric Company, Schenectady, N.Y.

[21] Appl. No.: 738,860

[22] Filed: Oct. 28, 1996

[51] Int. Cl.$^6$ .................................................. G01N 23/04
[52] U.S. Cl. .................................... 378/62; 378/98.12
[58] Field of Search ........................... 378/62, 98, 98.11, 378/98.12; 600/407, 431

[56] References Cited

U.S. PATENT DOCUMENTS

| | | | |
|---|---|---|---|
| 5,048,103 | 9/1991 | Leclerc et al. | 382/44 |
| 5,210,415 | 5/1993 | Ito | 378/62 |
| 5,647,360 | 7/1997 | Bani-Hashemi et al. | 600/407 |
| 5,690,106 | 11/1997 | Bani-Hashemi et al. | 600/407 |

OTHER PUBLICATIONS

R. Gupta et al., "Image Warping for Accurate Digital Subtraction Angiography", American Association for Artificial Intelligence, Spring Symposium Series, Mar. 21–23 1994, Stanford University, California.

L.H. Quam, Hierarchial warp stereo, in M.A. Fischler and O. Firschein, editors, Readings in Computer Vision, pp. 80–86. Morgan Kaufman Publishers, Inc., 1987.

*Primary Examiner*—David P. Porta
*Assistant Examiner*—David Vernon Bruce
*Attorney, Agent, or Firm*—Marvin Snyder; Douglas E. Stoner

[57] ABSTRACT

A locally-adaptive method for obtaining sub-pixel registration of mask and opacified digital X-ray images includes the steps of match point generation, locally-adaptive image-to-image warp generation, and log subtraction, for generating a DSA image. Specifically, in match point generation, a set of two-dimensional points in the mask image and their corresponding points in the opacified image are derived. After match point generation, locally-adaptive image-to-image warp generation is performed using the image-to-image match points; that is, a transformation function is generated that maps the matched points in the mask image to their corresponding points in the opacified image. The generated transformation is then applied to the mask image data and the logarithm of the pixel value in the transformed (i.e., warped) mask image is subtracted from the logarithm of the corresponding pixel value in the opacified image.

10 Claims, 2 Drawing Sheets

METHOD AND APPARATUS FOR DIGITAL SUBTRACTION ANGIOGRAPHY

FIELD OF THE INVENTION

This invention relates generally to X-ray imaging and, more particularly, to digital subtraction angiography for imaging vasculature.

BACKGROUND OF THE INVENTION

Digital subtraction angiography (DSA) is a known X-ray procedure for observing vasculature. In one known DSA imaging method, X-ray images of anatomy are taken before and after an X-ray opaque contrast agent is injected into the blood vessels. The X-ray image taken before injecting the contrast agent is sometimes referred to as the mask image and the X-ray image taken after injecting the contrast agent is sometimes referred to as the opacified image. Logarithmic subtraction of the mask image from the opacified image should remove all but the image data associated with the opacified blood vessels.

In principal, therefore, only the opacified vasculature should be visible in a DSA image. However, in practice, it is not unusual for a DSA image to contain artifacts and other image data in addition to the data associated with the opacified vasculature. For example, there typically is a time lag between the acquisition of pre-contrast and post-contrast images. Small patient motions during this interval cause misregistration between the two images, leading to motion artifacts in the final DSA image.

In addition, while certain types of patient motions can be controlled and minimized, several other types of involuntary motions (e.g., cardiac) are much harder to control without major intervention. Such involuntary motion has restricted, or limited, the use of DSA imaging in several anatomical regions. For example, in cardiac procedures, only the opacified images are used.

Further, it is sometimes necessary to move the X-ray imager between pre-contrast and post-contrast exposures. The imager usually cannot be repositioned at the exact same spot as the position in which the first image, i.e., the mask image, has been obtained. Also, mechanical vibrations occur in the structural components of the imager. As a result, the mask image and the opacified image typically are taken under slightly different settings, respectively. In general, the mask and opacified images should be regarded as images taken by two highly correlated, but different, cameras.

Hysteresis also causes differences in the mask image and the opacified image. Particularly, the mask and opacified images will be distorted differently due to changes in the electrical and magnetic environment. For example, during image acquisition, the mask images are acquired in a forward sweep of the imager gantry and opacified images are acquired in a reverse sweep of the gantry. Such electrical and magnetic differences result in artifacts in the DSA image due to a hysteresis effect In an attempt to address the problems associated with the different conditions under which the mask and opacified images are obtained, many angiography machines allow users to translate the mask image to better register the mask image with to the opacified image. A simple translation, however, can only correct for rigid patient motion aligned with the image plane. Such rigid patient motion, however, is rarely the type of motion which results in image artifacts.

Another known attempt to address such imaging problems is described in Gupta-Srinivas, "Image Warping for Accurate Digital Subtraction Angiography", Proc. of AAAI, Spring Symposium on Applications of Computer Vision in Medical Image Processing, Stanford University, March 21–23, 1994. The algorithm described by Gupta-Srinivas warps the mask image by using a global projective transformation to register the mask image to the opacified image. The global transformation applied to the mask image, however, applies the same transformation to all the pixels in the image. As a result, such algorithm does not correct for any misregistration changes from one part of the image to another part of the image. The causes of subtraction artifacts mentioned above, e.g., patient motion, involuntary motion, change in camera parameters, and hysteresis, generally result in misregistrations in the mask and opacified images which are different for different pixels.

It would be desirable to generate DSA images more accurately. Such accurate images should preferably have minimum artifacts due, e.g., to motion and hysteresis, and should be corrected for any misregistration changes from one part of the image to another part of the image.

SUMMARY OF THE INVENTION

Briefly, in accordance with a preferred embodiment of the invention, a locally-adaptive method for sub-pixel registration of mask and opacified digital X-ray images, which enables accurate subtraction of the mask image from the opacified image, includes the steps of generating match points, generating a locally-adaptive image-to-warp image transform, and performing log subtraction for generating a DSA image.

More specifically, in match point generation, a set of two-dimensional points in the mask image and their corresponding points in the opacified image are derived. After performing match point generation, locally-adaptive image-to-image warp generation is performed using the image-to-image match points. That is, a transformation function is generated that maps the matched points in the mask image to their corresponding points in the opacified image. The generated transformation is then applied to the mask image data and the logarithm of the pixel value in the transformed (i.e., warped) mask image is subtracted from the logarithm of the corresponding pixel value in the opacified image. Such subtraction is performed for each pixel. Upon completion of such subtraction for the entire image, the resulting data represents a DSA image.

The above described method provides accurate DSA images having fewer than the usual number of artifacts and is adaptive to correct for any misregistration changes from one part of an image to another part of the image.

DETAILED DESCRIPTION OF THE DRAWINGS

Figure 1:
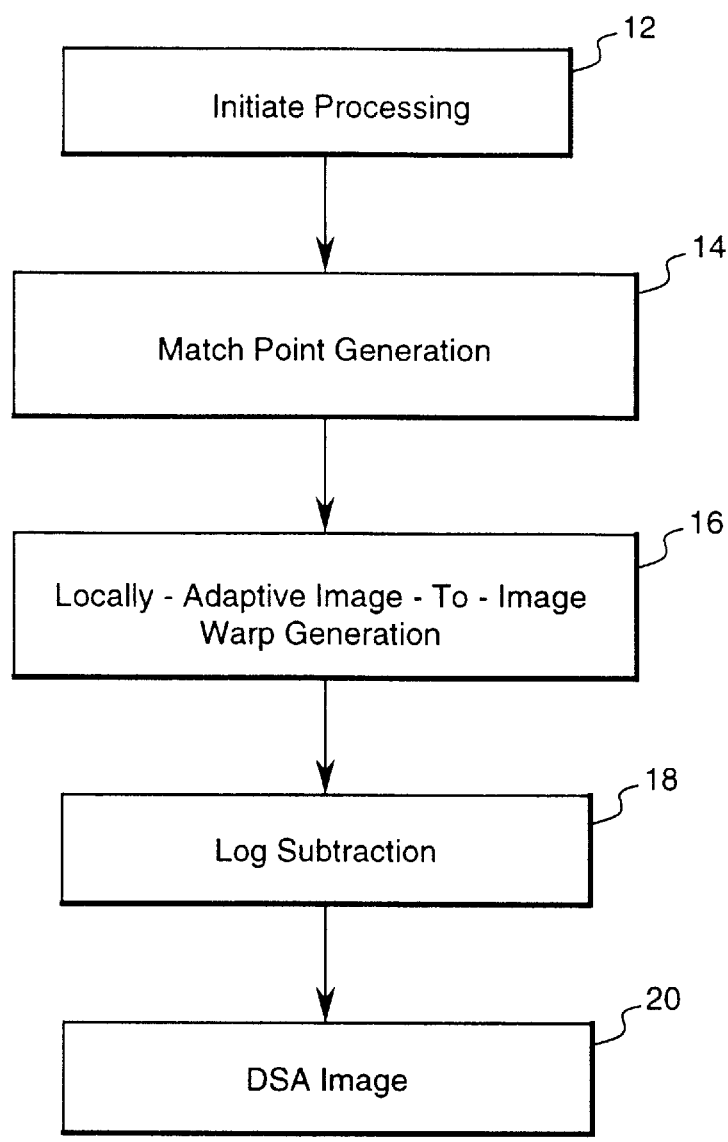
FIG. 1 is a flow chart illustrating processing steps in accordance with one embodiment of the present invention.

The flow chart of FIG. 1 illustrates a DSA method or process 10 for imaging vasculature, in accordance with one embodiment of the invention. Method 10 is a locally-adaptive method for sub-pixel registration of mask and opacified digital X-ray images which enables accurate subtraction of the mask image from the opacified image. Prior to executing method 10, mask image data and opacified image data for a region of interest are obtained.

After processing has been initiated at step 12, match point generation 14 is performed. In match point generation 14, a set of two-dimensional points in the mask image, and their corresponding points in the opacified image, are derived. The procedure outlined in Hannah, "A Description of SRI's Baseline Stereo System", Technical Report Tech. Note 365, SRI International Artificial Intelligence Center, October, 1985, or any other match-point computation method that results in a dense grid of matches between the mask and the opacified images, can be used as step 14.

After performing match point generation 14, locally-adaptive image-to-image warp generation 16 is performed. More specifically, using the image-to-image match points generated at step 14, a transformation that maps the matched points in the mask image to their respective corresponding points in the opacified image is generated at step 16 and the generated transformation is applied to the mask image data. Such transformed mask image data is sometimes referred to as warped data.

Once the transformation has been applied to the mask image data, the logarithm of the pixel value in the transformed (i.e., warped) mask image is subtracted from the logarithm of the corresponding pixel value in the opacified image at step 18. Such subtraction is performed for each pixel. Upon completion of such subtraction for the entire image, the resulting data at step 20 represents a DSA image.

More specifically, in one embodiment of process 10 described above, match-point generation 14 is performed in accordance with the method described in Gupta-Srinivas, "Image Warping for Accurate Digital Subtraction Angiography", Proc. of AAAI, Spring Symposium on Applications of Computer Vision in Medical Image Processing, Stanford University, March 21–23, 1994.

Figure 2:
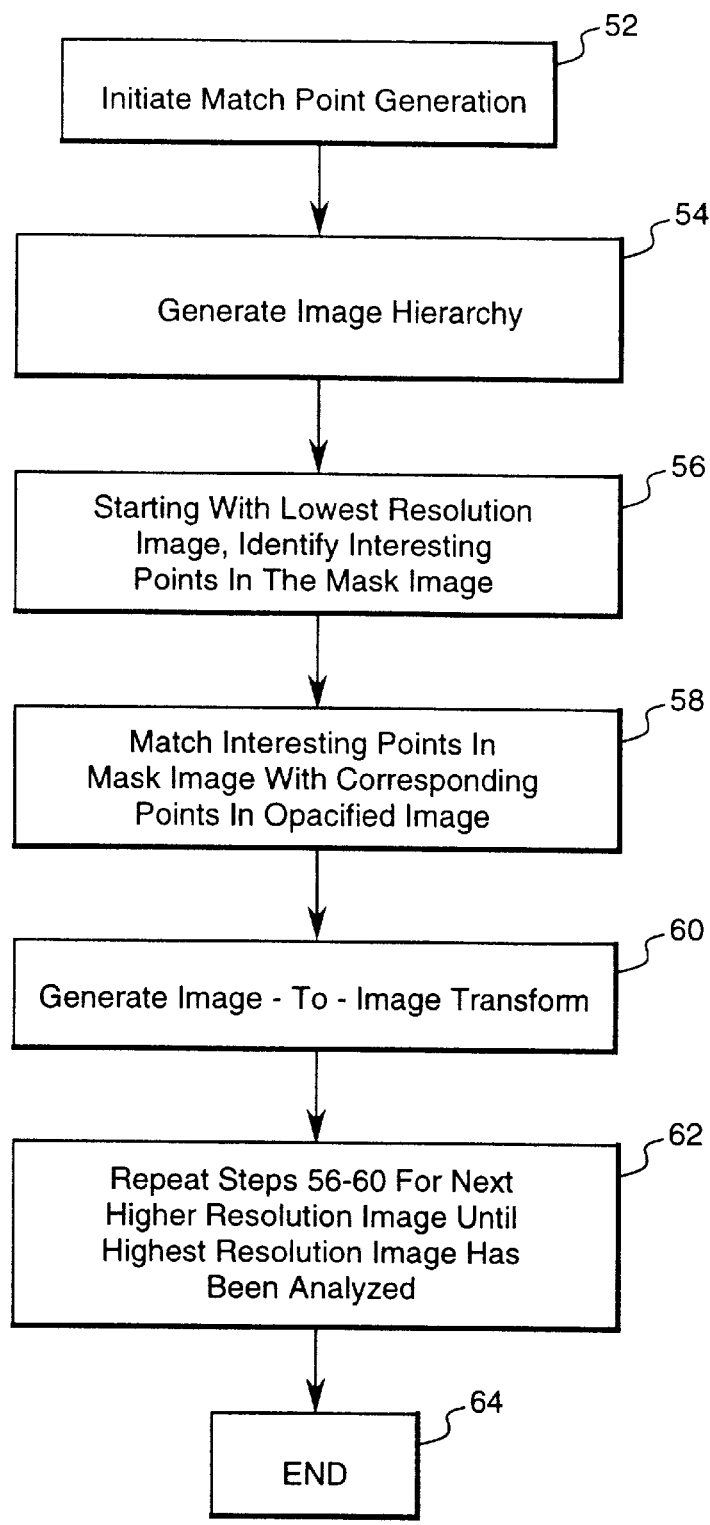
FIG. 2 is a flow chart illustrating processing steps for performing the match point generation processing step identified in the flow chart in FIG. 1.

FIG. 2 is a flow chart illustrating a method or process for performing match point generation 14 of FIG. 1. Specifically, and as a pre-processing step following initiation 52 of match point generation, an image hierarchy, or pyramid, is generated at step 54 in order to accelerate the computation of match points. Such hierarchy is generated by successively reducing both images in the stereo pair to half their size (and resolution) via subsampling using Gaussian convolution.

The matching process then begins with the lowest resolution image, i.e., at the bottom of the image pyramid, and works up to images with the highest resolution. More particularly, and starting with the lowest resolution image, a set of interesting points is identified in the mask image at step 56. The interesting points, in the one embodiment, correspond to the pixels with the highest resolution. Points of high local intensity variation are considered interesting because they are easy to match.

Initially, only the interesting points in the mask image are matched with their corresponding points in the opacified image, at step 58. In order to match a point in the mask image to its corresponding point in the opacified image, and in one embodiment, a small tile of imagery around the point in the mask image is correlated with all tiles in the opacified image. This process proceeds hierarchically from the lowest resolution to the highest resolution. The center of the tile in the opacified image that gives the maximum correlation is identified as the corresponding match point.

The image tiles in the mask and the opacified images may be rotated or translated with respect to each other. The mismatch arising because of such rotation is corrected by a two-dimensional perspective transformation of the mask image tile to the neighborhood of its corresponding tile in the opacified image based, on user-provided rough match points. The method described in Gupta-Srinivas, "Image Warping for Accurate Digital Subtraction Angiography", Proc. of AAAI, Spring Symposium on Applications of Computer Vision in Medical Image Processing, Stanford University, March 21–23, 1994, may be used.

Once a set of match points has been computed, the image-to-image transform for registering the image tiles between the mask and the opacified images is generated at step 60. The matching process is then repeated, as indicated at step 62, using this new transform which is more accurate than that obtained from user-provided match points.

After processing the highest resolution image data, the end 64 of the match point generation process is reached, completing the process. For a set of points on a square grid in the mask image, the corresponding match points are identified in the opacified image. Due to patient motion, hysteresis, and other such effects, the grid in the opacified image is not square.

Once a grid of match points has been found, the displacement (dx,dy) that should be added to each grid point in the mask image to find the coordinates of the corresponding point in the opacified image is determined. Specifically, dx and dy are considered as separable functions of the mask image coordinate (x, y). That is:

$$\begin{bmatrix} dx \\ dy \end{bmatrix} = \begin{bmatrix} f(x, y) \\ g(x, y) \end{bmatrix}$$

where f and g are two unknown functions whose values are known only at the grid points. The value of f and g at any arbitrary point in the mask image is determined by interpolation. Importantly, the two displacements along x and y are treated separately, and the interpolation technique used preserves the values at the grid points. Interpolation techniques such as general polynomial transformation, bi-cubic or thin-plate splines, or other types of global splines, e.g., the global spline described in Wolberg, "Digital Image Warping", IEEE Computer Society Press, Los Alamitos, Calif., 1990, can be used for performing the interpolation.

The location of each pixel in the mask image is transformed by the displacements given by interpolation to find the location of its corresponding pixel in the opacified image. The intensity of each pixel in the mask image is then log-subtracted from its corresponding pixel in the opacified image.

The above described method provides accurate DSA images having fewer artifacts, and is adaptive to correct for any misregistration changes from one part of an image to another part of the image. The method, moreover, is not limited to the specific implementation described above. For example, other hierarchical matching techniques, such as those described by Quam, "Hierarchical Warp Stereo", in M. A. Fischler and O. Firschein, editors, Readings In Computer Vision, pgs. 80–86, Morgan Kaufmann Publishers, Inc., 1987, can be used in match point generation. While a correlation-based matching scheme is described above, a feature-based matching scheme could alternatively be used.

The above described methods can be implemented by various types of processors such as, for example, a general purpose computer or an application specific integrated circuit (ASIC) including a microcontroller. The particular type of processor selected depends, for example, on the manner in which the image data is provided and other desired operating characteristics.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for generating a digital subtraction angiography image from mask image data and opacified image data, comprising the steps of:
   generating match points between interesting points in the mask image data and the opacified image data;
   generating a locally-adaptive global image transform using the generated match points;
   applying the global transform to the mask image data to generate warp image data; and
   subtracting the logarithm of a warp image data value from the logarithm of the corresponding opacified image data value.

2. The method of claim 1 wherein the steps of generating match points comprises generating a set of two-dimensional points in the mask image data, and identifying corresponding points in the opacified image data.

3. The method of claim 1 wherein the steps of generating match points comprises:
   generating an image resolution data hierarchy;
   selecting the lowest resolution image data; and
   for the selected image data:
   (a) identifying a set of interesting points;
   (b) matching the interesting points in the mask image data with corresponding points in the opacified image;
   (c) determining an image-to-image transform for registering image tiles between the mask and the opacified images; and
      (i) if the highest resolution image data has not been selected, selecting the next highest resolution image data and repeating steps (a)–(c); and
      (ii) if the highest resolution image data has been selected, ending the match point generation.

4. The method of claim 3 wherein the image resolution data hierarchy is generated by successively reducing both the mask image and the opacified image in a stereo pair to about half their original size with subsampling using Gaussian convolution.

5. The method of claim 3 wherein each of the set of interesting points corresponds to a respective one of the pixels with the highest resolution.

6. The method of claim 3 wherein the step of matching the interesting points in the mask image data with corresponding points in the opacified image comprises correlating a small tile of imagery around a point in the mask image with all of the tiles in the opacified image and identifying the center of the tile in the opacified image in order to determine the maximum correlation as the corresponding match point.

7. The method of claim 1 wherein the step of generating match points comprises identifying a grid of match points, and said method further comprises determining a displacement (dx,dy) that should be added to each grid point in the mask image to find coordinates of the corresponding point in the opacified image.

8. The method of claim 7 wherein dx and dy are related by:

$$\begin{bmatrix} dx \\ dy \end{bmatrix} = \begin{bmatrix} f(x, y) \\ g(x, y) \end{bmatrix}$$

where f and g are two unknown functions whose values are known only at grid points.

9. The method of claim 8 further comprising the step of determining values of f and g at an arbitrary point in the mask image by interpolation.

10. The method of claim 9 wherein the location of each pixel in the mask image is transformed by the displacements given by interpolation to find the corresponding pixel in the opacified image.

* * * * *